United States Patent
Poppen et al.

(10) Patent No.: US 9,151,614 B2
(45) Date of Patent: *Oct. 6, 2015

(54) POINT OF INTEREST SEARCH ALONG A ROUTE WITH RETURN

(71) Applicant: deCarta Inc., San Jose, CA (US)

(72) Inventors: Richard F. Poppen, San Jose, CA (US); Weidong Tang, Dailian (CN)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/748,065

(22) Filed: Jan. 23, 2013

(65) Prior Publication Data

US 2013/0138341 A1 May 30, 2013

Related U.S. Application Data

(63) Continuation of application No. 13/246,201, filed on Sep. 27, 2011, now Pat. No. 8,401,786, which is a continuation of application No. PCT/CN2009/071126, filed on Apr. 1, 2009.

(51) Int. Cl.
  *G01C 21/00* (2006.01)
  *G01C 21/34* (2006.01)
  *G01C 21/36* (2006.01)

(52) U.S. Cl.
  CPC ............ *G01C 21/00* (2013.01); *G01C 21/3476* (2013.01); *G01C 21/3679* (2013.01)

(58) Field of Classification Search
  CPC .................................................. G01C 21/3446
  See application file for complete search history.

(56) References Cited

U.S. PATENT DOCUMENTS

| 5,893,081 | A | * | 4/1999 | Poppen ......................... 705/400 |
| 5,978,730 | A | * | 11/1999 | Poppen et al. ................ 701/411 |
| 6,038,509 | A | * | 3/2000 | Poppen et al. ................ 701/416 |
| 6,377,887 | B1 | * | 4/2002 | Poppen et al. ................ 701/410 |
| 6,377,889 | B1 | * | 4/2002 | Soest ............................ 701/411 |
| 6,401,034 | B1 | | 6/2002 | Kaplan et al. |

(Continued)

FOREIGN PATENT DOCUMENTS

| CN | 1550755 A | 12/2004 |
| CN | 1906463 A | 1/2007 |

(Continued)

OTHER PUBLICATIONS

European Patent Office, Extended European Search Report, European Patent Application No. 09726607.6, Nov. 7, 2012, 9 Pages.

(Continued)

*Primary Examiner* — Jonathan M Dager
(74) *Attorney, Agent, or Firm* — Fenwick & West LLP

(57) ABSTRACT

A routing module identifies POIs that can be reached from a route with a cost less than distance m. A routing engine performs a reverse exploration on nodes in the planned route to locate POIs from which the route can be reached with a cost of less than a second cost n. POIs identified as being reachable from the route with a cost of less than m, and from which the route is reachable with a cost less than n are then further filtered to identify a subset of the POIs for which the sum of the time or distance from the route to the POI and the time or distance from the POI back to the route is less than a threshold time or distance, t.

18 Claims, 6 Drawing Sheets

(56) References Cited

U.S. PATENT DOCUMENTS

| | | | |
|---|---|---|---|
| 6,507,291 B1* | 1/2003 | Schreiner | 340/995.1 |
| 6,587,782 B1 | 7/2003 | Nocek et al. | |
| 6,859,724 B2* | 2/2005 | Komatsu | 701/533 |
| 7,565,239 B2* | 7/2009 | de Silva et al. | 701/426 |
| 8,243,060 B2* | 8/2012 | Stitt et al. | 345/418 |
| 8,260,549 B2* | 9/2012 | Poppen | 701/421 |
| 8,467,960 B2* | 6/2013 | Rinscheid | 701/416 |
| 8,630,791 B2* | 1/2014 | Yuasa | 701/123 |
| 8,781,729 B2 | 7/2014 | Nesbitt et al. | |
| 8,892,350 B2* | 11/2014 | Weir et al. | 701/400 |
| 2001/0004725 A1* | 6/2001 | Yagyu | 701/210 |
| 2002/0047787 A1* | 4/2002 | Mikkola et al. | 340/995 |
| 2002/0130906 A1* | 9/2002 | Miyaki | 345/837 |
| 2002/0133292 A1* | 9/2002 | Miyaki | 701/209 |
| 2003/0028320 A1* | 2/2003 | Niitsuma | 701/210 |
| 2003/0036848 A1* | 2/2003 | Sheha et al. | 701/209 |
| 2003/0125870 A1 | 7/2003 | Woestemeyer et al. | |
| 2003/0216860 A1* | 11/2003 | Shitamatsu et al. | 701/211 |
| 2004/0083055 A1* | 4/2004 | Hirose et al. | 701/210 |
| 2004/0102899 A1* | 5/2004 | Kaji et al. | 701/210 |
| 2004/0143387 A1* | 7/2004 | Shimizu et al. | 701/209 |
| 2004/0172193 A1 | 9/2004 | Monde et al. | |
| 2004/0215388 A1* | 10/2004 | Takenaka | 701/209 |
| 2004/0260465 A1 | 12/2004 | Tu | |
| 2005/0107949 A1* | 5/2005 | Yokota | 701/209 |
| 2005/0171686 A1 | 8/2005 | Davis | |
| 2005/0216191 A1 | 9/2005 | Sumizawa et al. | |
| 2005/0251327 A1* | 11/2005 | Ogasawara et al. | 701/200 |
| 2006/0106534 A1* | 5/2006 | Kawamata et al. | 701/208 |
| 2006/0116815 A1* | 6/2006 | Nomura | 701/210 |
| 2007/0005235 A1* | 1/2007 | Suzuki et al. | 701/200 |
| 2007/0005242 A1* | 1/2007 | Kato et al. | 701/211 |
| 2007/0010942 A1 | 1/2007 | Bill | |
| 2007/0032947 A1* | 2/2007 | Yamada et al. | 701/208 |
| 2007/0203638 A1* | 8/2007 | Tooyama et al. | 701/200 |
| 2007/0225910 A1* | 9/2007 | Fujiwara | 701/200 |
| 2008/0027639 A1* | 1/2008 | Tryon | 701/209 |
| 2008/0051995 A1* | 2/2008 | Lokshin et al. | 701/210 |
| 2008/0071471 A1* | 3/2008 | Sumizawa et al. | 701/209 |
| 2008/0177463 A1* | 7/2008 | Hamaguchi | 701/201 |
| 2008/0177465 A1* | 7/2008 | Barber et al. | 701/206 |
| 2008/0270014 A1* | 10/2008 | Nagase et al. | 701/118 |
| 2009/0018766 A1* | 1/2009 | Chen et al. | 701/202 |
| 2009/0037101 A1* | 2/2009 | Koike et al. | 701/209 |
| 2009/0082953 A1* | 3/2009 | Shimizu | 701/205 |
| 2009/0088964 A1* | 4/2009 | Schaaf et al. | 701/200 |
| 2009/0171561 A1* | 7/2009 | Geelen | 701/201 |
| 2009/0192705 A1* | 7/2009 | Golding et al. | 701/201 |
| 2009/0216732 A1* | 8/2009 | Feng | 707/4 |
| 2009/0234577 A1* | 9/2009 | Rinscheid | 701/201 |
| 2009/0281716 A1* | 11/2009 | Jung et al. | 701/200 |
| 2009/0319177 A1* | 12/2009 | Khosravy et al. | 701/207 |
| 2010/0088018 A1* | 4/2010 | Tsurutome et al. | 701/201 |
| 2010/0152997 A1* | 6/2010 | de Silva et al. | 701/200 |
| 2010/0251088 A1* | 9/2010 | Rasmussen et al. | 715/208 |
| 2012/0046819 A1* | 2/2012 | Agrawal et al. | 701/25 |

FOREIGN PATENT DOCUMENTS

| | | |
|---|---|---|
| CN | 101000371 A | 7/2007 |
| EP | 1376059 A2 | 1/2004 |
| EP | 1 936 519 A1 | 6/2008 |
| JP | 2004-257966 A | 9/2004 |
| JP | 2007040721 A | 2/2007 |
| JP | 2007-218770 A | 8/2007 |
| WO | WO 2007/037281 A1 | 4/2007 |
| WO | WO 2008/083749 A1 | 7/2008 |

OTHER PUBLICATIONS

Australian First Examination Report, Australian Application No. 2009231001, Apr. 3, 2013, 4 pages.
Australian First Office Action, Australian Application No. 2009343389, Jan. 24, 2014, 3 pages.
Australian Second Office Action, Australian Application No. 2009343389, Aug. 29, 2014, 3 pages.
Australian Third Office Action, Australian Application No. 2009343389, Feb. 3, 2015, 3 pages.
Australian Fourth Office Action, Australian Application No. 2009343389, Apr. 23, 2015, 3 pages.
Chinese First Office Action, Chinese Application No. 200980118512.5, Aug. 28, 2014, 23 pages.
Chinese Second Office Action, Chinese Application No. 200980118512.5, Nov. 29, 2013, 19 pages.
Chinese First Office Action, Chinese Application No. 200980159608.6, Dec. 3, 2013, 8 pages.
Chinese Second Office Action, Chinese Application No. 200980159608.6, May 19, 2014, 13 pages.
Chinese Third Office Action, Chinese Application No. 200980159608.6, Jan. 19, 2015, 13 pages.
European First Examination Report, European Application No. 09726607.6, Apr. 3, 2014, 5 pages.
European Second Examination Report, European Application No. 09726607.6, Dec. 4, 2014, 7 pages.
European Extended Search Report, European Application No. 09842490.6, Apr. 7, 2014, 5 pages.
Korean Office Action, Korean Application No. 10-2011-7025842, May 15, 2015, 6 pages. (with concise explanation of relevance).

\* cited by examiner

POINT OF INTEREST SEARCH ALONG A ROUTE WITH RETURN

CROSS-REFERENCE TO RELATED APPLICATIONS

This application is a continuation of application Ser. No. 13/246,201, filed on Sep. 27, 2011, which is a continuation of application serial number PCT/CN2009/071126, filed on Apr. 1, 2009. Each of the above applications is incorporated by reference herein in its entirety.

BACKGROUND

1. Field of the Invention

The present invention is directed to the use of navigation systems. In particular, the present invention enables better timing and routing information to be provided related to points of interest along a route.

2. Description of the Related Art

Navigation systems are popularly used to guide travelers to destinations. Such systems are available built into vehicles or free-standing, to be moved from vehicle to vehicle; for use by drivers and/or pedestrians; as purpose-built devices or as applications on general-purpose devices such as personal digital assistants or mobile telephones; and as systems that are entirely self-contained or as systems that utilize a remote server to perform some or all of their calculations. We refer generally to these systems as "navigation systems."

Since a common use of navigation systems is to guide the traveler to a desired destination, an important function of such systems is the selection of the destination. In some cases, the driver selects the destination by entering the address. In others, the driver selects the destination from a personal list of stored destinations, typically including home and work. In addition, the driver often wants to select a destination from a directory of "points of interest".

Points of interest ("POIs") include many kinds of destinations that drivers may want to find, either when running errands near home or when traveling away from home, such as hotels, restaurants, gas stations, stores of various kinds, roadside rest areas, and emergency services such as hospitals or police stations. The driver may want to search for any POI in a given category (e.g., any restaurant), or for a POI with a given name in a given category (e.g., a restaurant whose name contains "Taqueria"), or for a POI with a given name in any category (e.g., a POI whose name contains "Taqueria", without knowing whether the category should be "restaurant" or "fast food"). The driver may want to search for POIs radially around the current location, without regard to any previous or current destination. Alternatively, the driver may want to search for POIs near an already-computed route, for example, finding a gas station near the currently planned route to a destination. All of these kinds of search are commonly supported in modern navigation systems.

SUMMARY

The present invention enables searches for points of interest along a route, taking into consideration the cost (in time or distance) of deviating off the route to the POI, as well as the cost of returning to the route. A driver may be looking more or less urgently for a POI, and may therefore be willing to travel a greater or lesser distance off the currently-planned route. A driver who suddenly notices a fuel gauge approaching "empty" may be willing to travel several miles off-route to find a gas station soon, while a driver who is just beginning to feel hungry may be willing to drive half an hour down the route to find a restaurant very close to the route. The present invention also enables searching for POIs along a current route, even when the route has not been pre-programmed by the driver.

A system in accordance with the present invention includes a GPS module, user interface module, database and routing engine. The routing module identifies all POIs that can be reached from the route with a cost less than some threshold distance, m. This identification can be carried out, for example by performing an exploration using Dijkstra's algorithm. The routing engine then (or simultaneously) performs a reverse exploration on nodes in the planned route to locate POIs from which the route can be reached with a cost of less than a second threshold cost, n. This process can be performed, for example, by using a reverse Dijkstra exploration, exploring backwards in cost for n cost (e.g., miles or minutes) from the route along the directed graph to determine which POIs lie within a cost of n. POIs identified as being reachable from the route with a cost of less than m, and from which the route is reachable with a cost less than n are then further filtered to identify a subset of the POIs for which the sum of the time or distance from the route to the POI and the time or distance from the POI back to the route is less than a threshold time or distance, t.

DETAILED DESCRIPTION OF THE PREFERRED EMBODIMENTS

Since navigation systems are commonly used by drivers of vehicles, we frequently refer to the user of such a system as "the driver". However, the description that follows is not intended to be limited only to vehicle drivers; it may be applied equally to any use in which the user of the system is any kind of traveler, including, for example, a pedestrian, a bicycle rider, or a person using multiple modes of transportation, such as walking and riding public transit vehicles. In addition, while described in the context of public roadways and highways, the described systems and methods may also be used for aircraft navigation and marine navigation.

Figure 1:
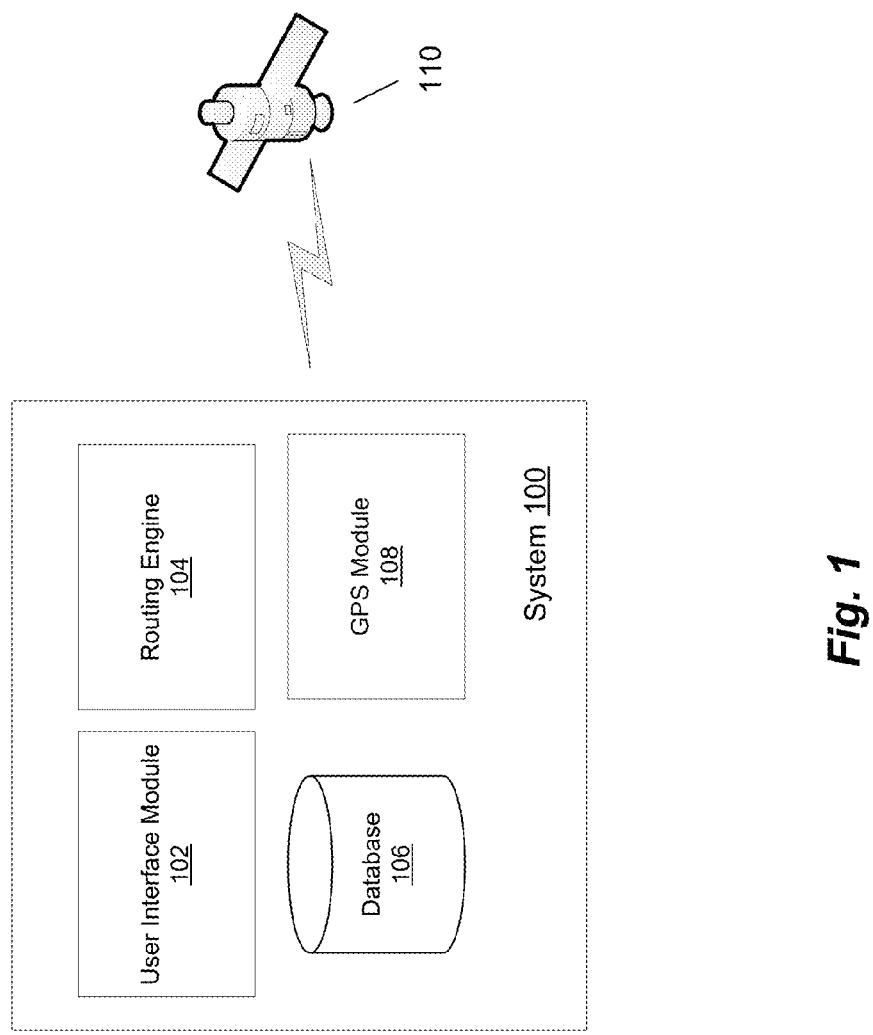
FIG. 1 is a block diagram of a navigation device in accordance with an embodiment of the present invention.

FIG. 1 is a diagram of a system 100 in accordance with an embodiment of the present invention. System 100 includes a user interface (UI) module 102, a routing engine 104, a database 106, and GPS module 108. UI module 102 provides one or more screens of information and enables the driver to communicate with the navigation system 100. Routing engine 104 manages route planning and guidance functions, including routing to and from POIs along a route as described below. Database 106 provides local storage for navigation system 100 and may include information about POIs and other features such as roads, intersections, terrain, and the like. GPS module 108 performs GPS location functions and receives GPS signals from GPS satellites 110. Note that although in the described embodiment navigation system 100 uses GPS to determine its location, alternative technology may be used, particularly as newer technology is developed. The present invention is equally applicable regardless of the manner in which system 100 derives its location.

User interface module 102 provides many of the user interface functions conventionally available on personal navigation devices. For example, UI module 102 allows a user to specify a destination by entering an address or selecting from a list. In addition, UI module 102 in various embodiments of the present invention includes interface elements for receiving POI search preferences from a driver, and for presenting POI search results and routing information, as described more fully below.

We begin with an example to illustrate the operation of system 100. In this example, a driver sets out on a lengthy road trip from San Francisco, Calif. to Alexandria, Va. Routing engine 104 plots the best route, taking into account any preferences selected by the driver—for example, avoiding toll roads. User interface module 102 displays the plotted route, and the driver sets out along Interstate 80 heading east.

After driving for several hours, the driver begins to get hungry. By referring to the user interface, the driver observes he has just passed through Mill City, Nev. The next major town along his route is Winnemucca, which is likely to have several restaurant options. Alternatively, the small town of Cosgrave, which has a single restaurant, is much closer. Cosgrave, however, is not along the interstate, and would require a deviation of some distance from the driver's planned route. While eating sooner would be a positive experience for the driver, it is also important to him to arrive in Salt Lake City, Utah before dark. He is unsure of the delay involved in deviating to the Cosgrave restaurant, and would prefer to make an informed choice.

By selecting a POI search function in the user interface, the driver is presented by system 100 with a list of POIs from which to choose. The list may be presented in a number of ways, depending on implementation. In one embodiment, for example, the user selects POI search, then filters by a restaurants category. User interface module 102 then presents the driver with a list of restaurants within a given distance (which may be radial, driving time, or driving distance, as explained below). For each POI not along the driver's route, user interface module 102 displays two distances: the distance down the route to a point from which the driver would deviate toward the POI (the "along-route distance" to the "route departure point"), and the distance by which the POI is off the route (the "off-route distance"). In our example, the along-route distance is 8.5 miles, and the off-route distance is 1.1 miles. Alternatively, the driver can configure system 100 to display the estimated time off-route caused by the deviation based on information stored in database 106 about the detour, including for example the estimated speed along the off-route portion. In this example, the delay is about two minutes. The driver decides that the two minutes is an acceptable time, and therefore deviates to Cosgrave.

Figure 2:
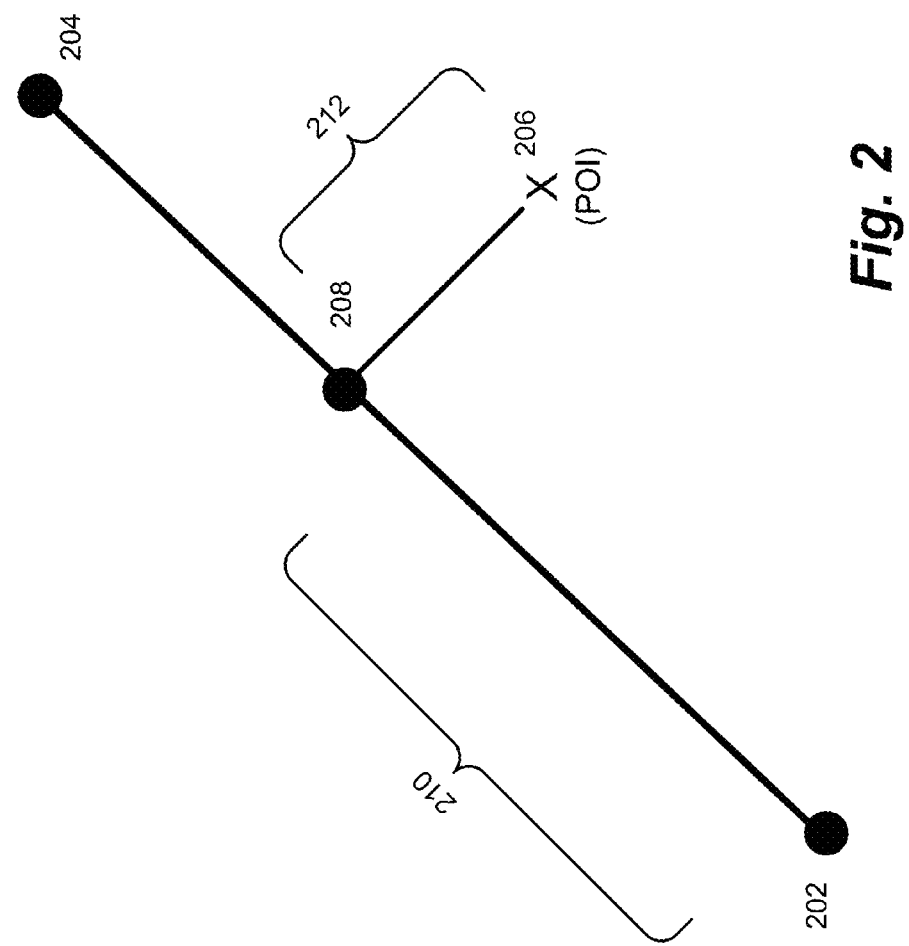
FIG. 2 illustrates a routing from an origin to a destination and a point of interest in accordance with an embodiment of the present invention.

FIG. 2 illustrates the distinction between along-route distance and off-route distance. In FIG. 2, the driver's planned route is from point 202 to point 204. Assume a POI is located at point 206, and to get to the POI the driver has to turn off the route onto another road at point 208. Then the along-route distance 210 is the distance from 202 to 208, and the off-route distance 212 is the distance from point 208 to 206.

In another embodiment, the two distances are, first, the sum of the along-route distance and the off-route distance (the "total distance") and, second, the off-route distance. In yet another embodiment, the two distances are the along-route distance and the total distance.

In conventional navigation systems showing one distance to each POI, the POIs are typically sorted in order of increasing distance. In one embodiment of the present invention, routing engine 104 sorts POIs in order of increasing along-route distance. In other embodiments, routing engine 104 sorts POIs in order of increasing total distance or in order of increasing off-route distance. Note that the distance used as the sort criterion need not be one of the distances displayed by user interface module 102.

Figure 3:
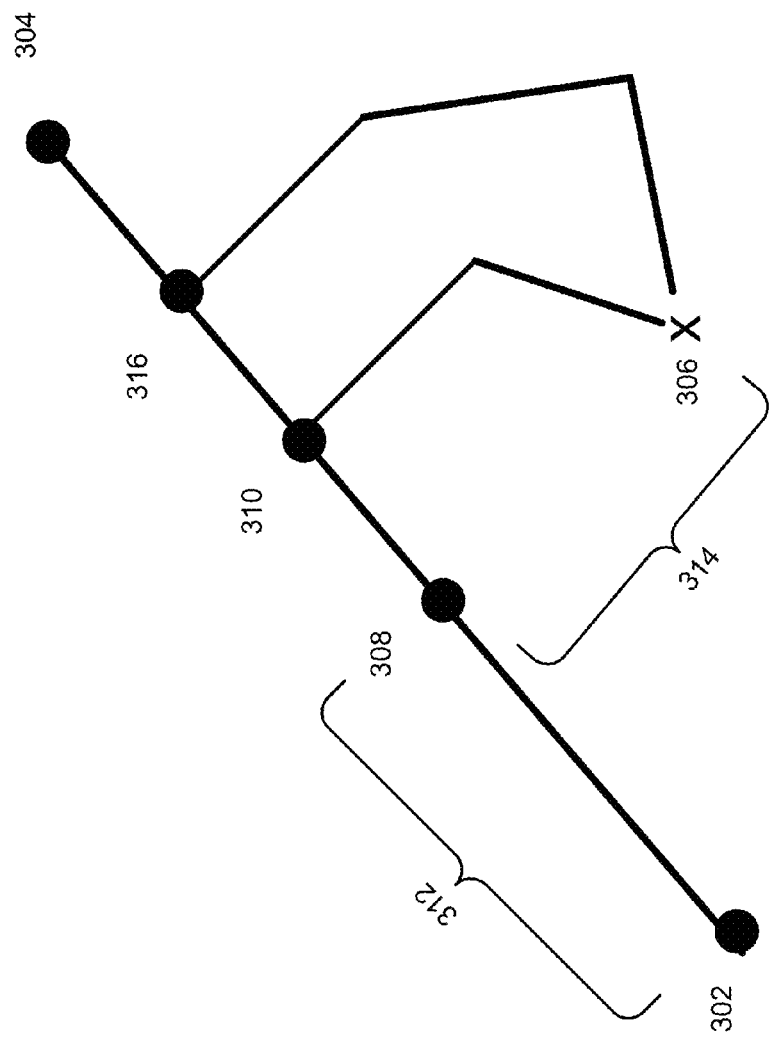
FIG. 3 illustrates multiple routings from an origin to a point of interest in accordance with an embodiment of the present invention.

In one embodiment, and referring to FIG. 3, the along-route and off-route distances are computed purely geometrically. In this embodiment, the route departure point 308 is the point on the route nearest to the POI 306 in Euclidean distance, the off-route distance of the POI is the Euclidean distance 314 from the route departure point 308 to the POI 306, and the along-route distance 312 is the distance, measured along the route, from the current location 302 to the route departure point 308. In another embodiment, the along-route and off-route distances are computed by measuring driving distance. In this embodiment, the route departure point is a point on the route 310 from which the driving distance (rather than the Euclidean distance) to the POI is minimized, the off-route distance is the driving distance along roads, rather than the Euclidean distance, from the route departure point 310 to the POI 306, and the along-route distance is the driving distance along the route from the current location 302 to the route departure point 310. In another embodiment, another metric to be minimized is used instead of driving distance. For example, estimated driving time can be used. In that case, the route departure point is a point 302 on the route from which the estimated driving time to the POI 306 is minimized, the off-route "distance" is the estimated driving time from the route departure point 316 to the POI 306, and the along-route "distance" is the estimated driving time from the current point 302 to the route departure point 316. One of ordinary skill in the art will understand that a wide variety of distance measures can be used.

In some embodiments, the definition of along-route and off-route distance can be varied slightly, in the following way: The route departure point is a point on the route such that the distance along the route to the point plus the distance from the point to the POI is minimized. Here "distance" can be driving distance, estimated driving time, or any other measure of distance to be minimized.

In one embodiment, the search for POIs is limited to a "search distance", that is, a specified distance (in terms of Euclidean distance, driving distance, estimated driving time, or another distance measure) from the route. That is, only POIs within this distance threshold will be displayed to the user. In one embodiment, the user specifies different default search distances for different categories. For example, the driver may be willing to travel 5 miles from the route to reach a gas station, but only 3 miles from the route to reach a restaurant. In one embodiment, user interface module 102 offers the driver, in addition to a list of POIs with their along-route and off-route distances, a "more urgent" and/or a "less urgent" button. As will be understood, as with other parts of the user interface, the "button" may be a real button, a virtual button on a touchscreen, or other suitable type of user interface element. When the "more urgent" button is pressed, the routing engine 104 repeats the search, but with a greater limit for the maximum off-route distance. Routing engine 104 will then tend to find more POIs closer to the current position, but farther off the route. When the "less urgent" button is pressed, routing engine 104 repeats the search, but with a smaller limit for the maximum off-route distance. Routing engine 104 will then tend to find POIs farther from the current position, but closer to the route and therefore more convenient for the driver if the driver is willing to drive farther before reaching the POI.

In one embodiment, common POI searches are made more convenient to the driver by having one or more "I need" buttons accessible to the user with fewer actions (e.g., by pressing fewer buttons) than for general POI searches. In one embodiment, for example, the map display screen of user interface module 102 has an "I need gas" button and an "I need food" button on screen for quick access to searches. In another embodiment, the map display screen has an "I need" button; when the "I need" button is pressed, the screen switches to a simple menu with very common, popular choices, for example, "I need gas", "I need a hotel" and "I need food." In some embodiments, the selection of "I need" buttons on the primary map screen or on the secondary screen is configurable by the user. Thus, one driver who likes coffee can put coffee outlets in the quick "I need" menu, while another driver who doesn't like coffee but does like to buy soft drinks at convenience stores can leave coffee off the quick "I need" menu but include convenience stores.

In some embodiments, routing engine 104 is able to search along a route even when there is no route currently calculated. For example, a driver may not have calculated a route because the driver is so familiar with the route that guidance is not necessary. Still, the driver may want to search for unfamiliar POIs such as gas stations or fast-food outlets even along a familiar route. Routing engine 104 is enabled to perform this kind of search by inferring a likely route. In one embodiment, routing engine 104 assumes that the driver will continue along a route with the same name as far as possible, and, when the road name does not continue, that the driver will continue as nearly straight as possible along roads of the same or greater importance. Routing engine 104 then uses that inferred route as the route along which to search. In such a case, the route may be searched in a conventional manner, or using the techniques described here. In alternative embodiments, routing engine 102 makes the inference more likely by tracking the driver's behavior over multiple trips, and, when the driver is on a road that system 100 recognizes as being used often in the driver's habitual behavior, inferring that the driver will follow the route that he or she most often follows when on the current road. In one embodiment, system 100 stores a history of previous routes (whether pre-programmed or not) taken by the driver. The number of routes in the history is variable according to the preference of the implementer and/or the driver. Route generator 104 then searches previous routes to predict whether the driver is currently following one of them. Route generator 104 then chooses the route with the highest prediction score in order to infer the route and provide POI assistance. In another embodiment, route generator 104 maintains a list of past destinations (as opposed to routes to the destinations), and identifies one or more of the past destinations located in or near the direction of travel. A destination is in or near the direction of travel in one embodiment if the distance to the destination is decreasing. Route generator 104 then selects the previous destination being approached most rapidly and plots a route to it. This route is then the predicted route along which POIs are searched.

Figure 4:
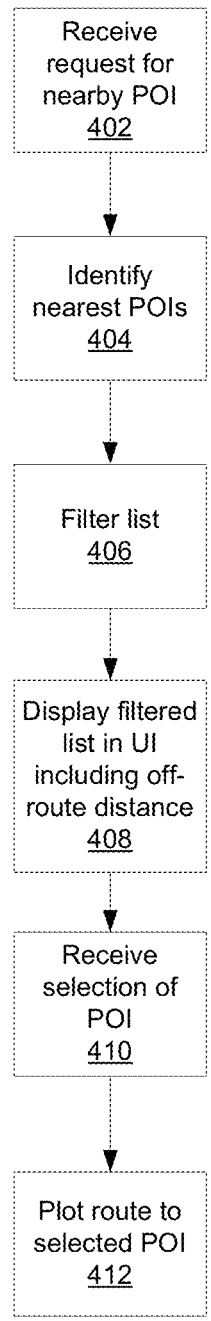
FIG. 4 is a flowchart illustrating a method for providing point-of-interest search along a route in accordance with an embodiment of the present invention.

FIG. 4 is a flowchart illustrating a method for providing point-of-interest search along a route in accordance with an embodiment of the present invention. System 100 receives 402 a request from a driver to display a list of nearby POIs. As noted, this request may be limited to specific categories, or may simply be a request for all known POIs along the route. Also as noted, the request includes a distance or time limitation, or alternatively a default limitation is used. Route engine 104 performs a search, for example using database 106, and identifies 404 a set of nearby POIs. Route engine 104 then filters 406 the list according to the distance or time parameters supplied by the driver or by default. User interface module 102 displays 408 the filtered list, along with deviation information including along-route and off-route distances or times, etc., as described above. In one embodiment, for example where the driver does not need directions to the POI, the driver simply proceeds without obtaining further route guidance. Alternatively, the driver requests and the user interface module receives 410 a selection of the POI, and then plots 412 a route to the selected POI.

Figure 5:
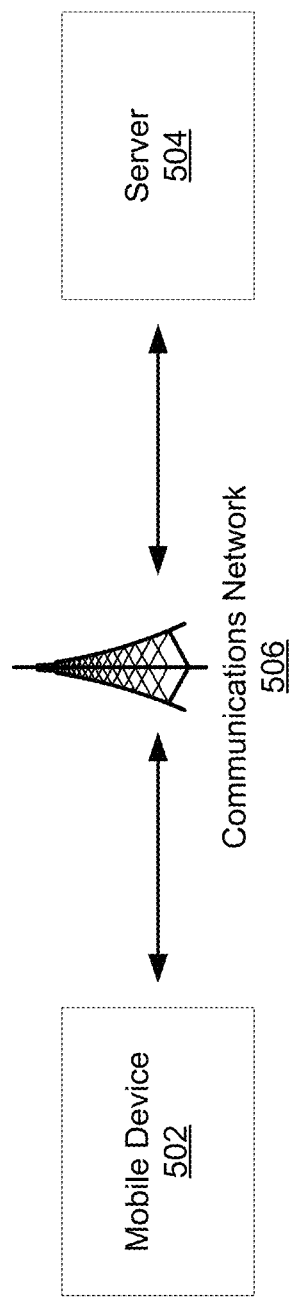
FIG. 5 illustrates communication between a mobile device and a server in accordance with an embodiment of the present invention.

In various embodiments, the computations described above are performed not on the mobile device but rather on a server. FIG. 5 illustrates a server 504 that is in communication via a communications network 506 with mobile device 502. The driver's particular request for a POI and data about the driver's current location and planned route or direction of travel are sent by mobile device 502 to server 504 via communications network 506. Server 504 determines the list of appropriate results and returns the information to mobile device 102 for display to the user. This allows mobile device 502 to operate with less processing and storage requirements, and also allows for more centralized updating of POI and routing information.

Techniques for searching based on Euclidean distance are known to one of ordinary skill in the art. There are many ways to search in an area such as the area along a route. One indexing scheme is taught in U.S. Pat. No. 5,963,956, incorporated herein by reference in its entirety. In that method, and in many other known indexing methods, it is possible to find records that come within a specified distance of the route. One can retrieve all POIs in such records, and then compute the Euclidean distance to the route and the nearest point on the route, and discard those POIs for which the Euclidean distance to the route exceeds the desired threshold.

When searching is to be based on driving distance, the search can be performed by starting with a search based on Euclidean distance and then adding an additional filtering step. Suppose the threshold distance is d km. If a POI is more than d km from the route in Euclidean distance, it is certainly more than d km from the route in driving distance, since the driving distance must be at least as long as the Euclidean distance, which is essentially a straight line. Thus a first search operation can find those POIs within d km of the route in Euclidean distance. Then the road network can be explored to determine whether the POI is within d km of the route in driving distance.

This secondary filtering operation can be performed in either of two ways. The road network can be explored (using, for example, Dijkstra's algorithm, which is well known to practitioners of the art) outward from the POI until all roads within a distance if d km have been explored or until the route is reached, whichever comes first. If the route is not found within d km of the POI, the POI is more than d km in driving distance from the route and can be rejected. If the route is found within d km of the POI, we know the nearest point on the route and the distance to that nearest point.

Alternatively, the distance to multiple POIs can be checked simultaneously by exploring the road network (using, for example, Dijkstra's algorithm) outward from the route, rather than from the POIs. The exploration can be performed until all roads within d km of the route have been explored. For those POIs which have been reached in the exploration, we know the nearest point on the route and the distance to that point. Those POIs which are not reached in the exploration are not within d km of the route.

In some cases, exploration from the POIs is more efficient, and in others exploration from the route is more efficient. In general, the denser the POIs are in the area around the route, the more efficient it is to perform the search starting at the route. In some embodiments, a decision is made at run time whether to search from the POIs or from the route on the basis of a criterion involving the length of the route, the search radius, and the number of POIs that pass the initial test. In one such embodiment, the test is performed as follows: The assumption is made that the amount of computation expended in searching is roughly proportional to the search area. If the length of the route is l, and the maximum search distance is r, the area to be searched if searching starts at the route is approximately $2lr+\pi r^2$. If, further, the number of POIs that pass the initial filter is n, the area to be searched if searching starts at the POIs is approximately $n\pi r^2$. This means that the amount of computation expended if starting at the POIs exceeds that expended if starting at the route if and only if $n\pi r^2 > 2lr+\pi r^2$, i.e., if and only if $(n-1)\pi r > 2l$, i.e., if and only if $n > 1+2l/\pi r$. Accordingly, the search is made from the POIs if $n \leq 1+2l/\pi r$ and from the route if $n > 1+2l/\pi r$. (The case in which n is exactly equal to $1+2l/\pi r$ is rare, and thus there is little or no difference which decision is made in that case.)

When searching is based on driving time, the search is performed in much the same manner. If driving time is to be estimated, then there is a speed associated with each road element in the map. Route engine 104 can therefore know the maximum speed associated with any road anywhere in the database. By using that maximum speed, it can determine a maximum distance such that any POIs within the maximum driving time at the maximum speed must also be within the maximum distance. (If the driving-time threshold is t hours, and the maximum speed anywhere in the database is s km/h, then any point within a driving time of t hours will also be within a driving distance of st km, and therefore also within a Euclidean distance of st km.) The first filtering can be performed as described above, and then exploration using driving time can be performed exactly as described above for exploration using driving distance.

As noted above, in some embodiments, the route departure point is chosen so as to minimize not the driving distance from the route to the POI, but rather the total distance from the origin to the route departure point plus the distance to the POI. In such embodiments, the step of finding the route departure point can be performed with a modification to Dijkstra's algorithm. Dijkstra's algorithm as usually implemented maintains a best known distance from the origin to each node in the exploration, as well as an indication of the previous node in the best route from the origin. In this embodiment, Dijkstra's algorithm is modified so that, for each node, both a best known distance from the origin and a distance from the initial route are maintained, as well as an indication of the previous node. For each node in the initial route, the best known distance from the origin is initialized to be the distance from the origin to that node, and the distance from the route is initialized to zero. Then Dijkstra's algorithm is applied in the usual way, but a given node is not explored from if the distance from the route is greater than the limiting distance. POIs not reached in this exploration are beyond the limiting distance. The route that minimizes the distance to each POI from the origin is obtained by following the references to previous nodes from the POI back until the original route is reached.

Returning to the Route

We now describe additional embodiments that take into account not just the cost (in time or distance) of departing from the route, but also the cost of returning to the route from the POI. This is more than a trivial concern, because quite often routes are not reversible. Consider, for example, a freeway interchange that includes only an exit, but not an entrance—something that is common in the U.S. Interstate System, as well as other global freeway systems. In such a case, it may be true that a particular POI located at that exit is well within the threshold distance or time specified by the driver or manufacturer; however, it may also be true that returning to the freeway from the POI requires traveling along a secondary road—and in some cases, in the wrong direction relative to the driver's destination—to re-enter the freeway. That experience can easily transform a stop that seemed like a good idea at the time into a frustrating and unexpected detour.

Figure 6:
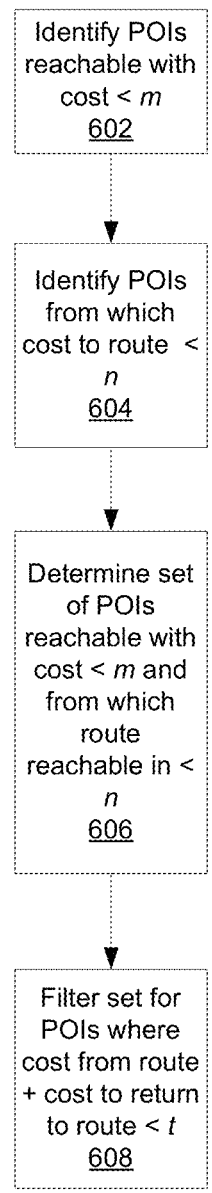
FIG. 6 is a flowchart illustrating a method for providing point-of-interest search along a route in accordance with an embodiment of the present invention.

Referring to FIG. 6, routing engine 104 begins by identifying 602 all POIs that can be reached from the route with a cost less than m. For example, if cost is a measure of driving time, then routing engine 104 identifies all POIs that can be reached within m minutes from some point on the route. This can be achieved by performing an exploration using Dijkstra's algorithm, for example. Next, routing engine 104 performs 604 a reverse exploration on nodes in the planned route to locate POIs from which the route can be reached with a cost less than n. A reverse Dijkstra algorithm explores backwards in time (i.e. in cost) for n minutes (or n miles) from the route along the directed graph to determine which POIs lie within that n minute (or n mile) distance. In the reverse Dijkstra exploration, the search from each node determines the nodes from which that node can be reached. This is distinguished from a normal (forward) Dijkstra exploration, in which the search from each node determines the nodes that can be reached from that node.

Routing engine 104 then keeps 606 the set of POIs that can both be reached from the route with a cost of less than m, and from which the route can be reached with a cost of less than n. That is, if both m and n are set equal to a time t, then the kept set of POIs comprises all of the points that the driver can reach and return to the route from in less than time t. Of course, this set also includes a number of false positives (POIs that require longer than time t to go to and return to the route from), but the way in which the set is generated results in no false negatives. Routing engine 104 then filters 608 the kept set to identify those POIs for which the sum of the time to the POI from the route and the time to the route from the POI is less than t.

Note that it is also possible that a POI lies not at a node, but along a link between two nodes. In that case, if the node at the far end of the link is reachable within time t, then the POI is reachable in slightly less than time t, since it occurs earlier in the link, and takes correspondingly longer time to return to the route from. Therefore, the node at the end of the link passes the t minute test if and only if the POI also passes the test, and therefore the POI on a link is acceptable exactly if the node at the end of the link passes the test.

Although routing engine 104 is still performing a sizable number of explorations, because the route may be asymmetric routing engine 104 cannot simply assume that any POI reachable in time t/2 and from which the route is reachable in time t/2 represents the complete set of POIs being sought. For example, imagine a POI that takes only 1 minute to reach from the route, but from which 9 minutes is required to reach a point on the route—for example, where the freeway exit has no corresponding on-ramp. If t is 10 minutes, then the POI should be included in the final result set. However, if routing engine 104 simply considered POIs reachable in t/2 minutes and returnable from in t/2 minutes, this POI would be missed.

To reach a node, the driver travels down the route for some distance, and then off the route for an additional distance. If the distance down the route is r, and the distance from route departure to the node is s, then the total distance d is r+s. In one embodiment, routing engine 104 tracks s and d (from which r can be inferred when needed). Alternatively, routing engine could track r and d, or r and s, the third variable inferred from the other two.

Typically, in following Dijkstra's algorithm to perform an exploration, if a second path to a node is found, the second path is kept, and the first path replaced, if the second path is lower cost than the first. In one embodiment, routing engine 104, however, considers a better path to be a path having a lower cost from the route origin, as opposed to from the route departure point, and if the second path to the node has a lower cost from the route origin, replaces the previously known best path with the second path, and stores the associated pair of costs (e.g., s and d above). As a consequence, routing engine 104 may sometimes replace a path that has a lower cost from the route departure point with a path that has a greater cost from the route departure point, but a lower cost from the origin. For example, a first path, which involves a cost of 5 minutes down the route and 1 minute off the route, for a total of 6 minutes, would be replaced with a second path having a cost of 3 minutes down the route and 2 minutes off, for a total of 5 minutes—even though the off-route cost of 1 in the first path is less than the off-route cost of 2 in the second path. The stopping criterion for exploration is a cost of m off of the route and n to return to the route, so when both explorations have finished, routing engine 104 has determined the best way to get from the route origin to the node, and which doesn't involve deviating from the route for more than t minutes.

Routing engine 104 in one embodiment filters the results based on cost from origin to route departure point, plus cost from the departure point to the node, plus cost from the node to the return point on the route, plus cost from the return point to the destination, and minus the cost from the origin to the destination along the original route. This results in the amount of extra driving (in time or distance) incurred by deviating to the POI along the best known way.

In some situations, a POI may lie very close to a potential route from origin to destination, although that potential route is not the shortest (or fastest) route from origin to destination. For example, there are two highway routes from San Jose, Calif. to San Francisco. The shorter of the two is along US Highway 101; the longer of the two is along Interstate 280. The difference is not substantial, however—about 1-5 miles, depending on the ultimate destination in San Francisco. Assume now that there is a POI within 2 miles of a particular exit on Interstate 280, and the user has defined a threshold maximum of 10 miles as an acceptable total detour distance. If Highway 101 is the initially planned route, then taking Interstate 280 instead would result in a net extra driving distance of fewer than 10 miles, which would be acceptable to the driver. To find this POI, however, routing engine 104 would have to undertake an expansive exploration from the original route—perhaps looking as far as 30 miles from the original route (since Highway 101 and Interstate 280 run roughly parallel to each other, but on opposite sides of Silicon Valley). This exploration is certainly possible using the techniques described above, and in one embodiment routing engine 104 is configured to and does perform such an exploration. In an alternative embodiment, however, routing engine 104 places a tighter bound on the distance from the route and on the distance required to return to the route—for example 5 miles. That bounding would miss the POI along Interstate 280 for the reasons noted above, but would require substantially less computing power. In that embodiment, routing engine 104 is still guaranteed to find every known POI less than t minutes extra drive, and less than 5 miles from the original route and less than 5 miles back to the route from the POI.

While the present invention has been described above in particular detail with respect to a limited number of embodiments, other embodiments are possible as well. The particular naming of the components and their programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, as illustrated for example by the description of FIG. 4, and functions performed by multiple components may instead performed by a single component. For example, the particular functions of the routing engine 104 may be provided in many or one module.

The operations described above, although described functionally or logically, may be implemented by computer programs stored on one or more computer readable media and executed by a processor. Computer readable storage media include, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Throughout the description, discussions using terms such as "processing" or "computing" or "calculating" or "determining" or "displaying" or the like, refer to the action and processes of a particular computer system, or similar electronic computing device, that manipulates and transforms data representing or modeling physical characteristics, and which is represented as physical (electronic) quantities within the computer system memories or registers or other such information storage, transmission or display devices.

The algorithms and displays presented above are not inherently related to any particular computer or other apparatus. Various general-purpose systems may also be modified by using the teachings herein, or it may prove convenient to construct more specialized apparatus to perform the described method steps. The required structure for a variety of these systems will appear from the description above. In addition, the present invention is not described with reference to any particular programming language, any suitable one of which may be selected by the implementer.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention.

What is claimed is:

1. A method for providing routing to a point of interest, the method comprising:
    identifying a first set of points of interest, each point of interest in the first set reachable from a planned navigation route with a cost less than a first threshold cost;
    identifying a second set of points of interest, the planned navigation route reachable from each point of interest in the second set with a cost less than a second threshold cost;
    determining a third set of points of interest, the third set including only the points of interest in both the first and second set;
    determining a fourth set of points of interest, the fourth set including only the points of interest in the third set wherein a cost to reach the point of interest from the route plus a cost to return to the route from the point of interest is less than a third threshold cost; and
    displaying the fourth set of points of interest in a user interface of a navigation device.

2. The method of claim 1 wherein the third threshold cost is a driving distance.

3. The method of claim 1 wherein the third threshold cost is an estimated driving time.

4. A system for providing routing to a point of interest, comprising:
    a database storing point of interest data;
    a global navigation satellite system radio, adapted to determine a current location of a user;
    a routing engine, coupled to the global navigation satellite system radio and the database, adapted to:
        identify a first set of points of interest, each point of interest in the first set reachable from a planned navigation route inferred from the direction of travel of the user with a cost less than a first threshold cost;
        identify a second set of points of interest, the planned navigation route reachable from each point of interest in the second set with a cost less than a second threshold cost;
        determine a third set of points of interest, the third set including only the points of interest in both the first and second set;
        determine a fourth set of points of interest, the fourth set including only the points of interest in the third set wherein a cost to reach the point of interest from the route plus a cost to return to the route from the point of interest is less than a third threshold cost; and
    a user interface module, coupled to the routing engine, adapted to display one or more indicia of the distance to the point of interest.

5. The method of claim 4 wherein the global navigation satellite system radio is a GPS radio.

6. A computer program product for providing routing to a point of interest, the computer program product stored on a non-transitory computer-readable medium and including instructions adapted to cause a computer to execute steps comprising:
    identifying a first set of points of interest, each point of interest in the first set reachable from a planned navigation route inferred from a direction of travel of a user with a cost less than a first threshold cost;
    identifying a second set of points of interest, the planned navigation route reachable from each point of interest in the second set with a cost less than a second threshold cost;
    determining a third set of points of interest, the third set including only the points of interest in both the first and second set;
    determining a fourth set of points of interest, the fourth set including only the points of interest in the third set wherein a cost to reach the point of interest from the route plus a cost to return to the route from the point of interest is less than a third threshold cost; and
    displaying the fourth set of points of interest in a user interface of a navigation device.

7. A computer-implemented method for providing routing to a point of interest, the method comprising:
    identifying, for each point of interest in a first set of points of interest, a cost to reach the point of interest from a navigation route inferred from a direction of travel of the user without a user input destination and a cost to return to the navigation route from the point of interest;
    determining, for each point of interest in the first set of points of interest, a detour cost for the point of interest by combining the cost to reach the point of interest from the navigation route and the cost to return to the navigation route from the point of interest;
    identifying a second set of points of interest from points of interest in the first set of points of interest that have a detour cost less than a maximum detour cost;
    displaying the second set of points of interest in a user interface of a navigation device.

8. The method of claim 7, wherein the inferred navigation route is based in part on a prediction score determined by tracked user behavior.

9. The method of claim 7, wherein the detour cost is measured in estimated driving time.

10. The method of claim 7, wherein the maximum detour cost is selected by the user, and further comprising
    providing a user interface to the user for selecting the maximum detour cost;
    receiving, from the user on the user interface, a selection of a maximum detour cost; and
    setting the maximum detour cost based on to the selection.

11. The method of claim 10, wherein the user selection of a maximum detour cost is a relative measurement, and setting the maximum detour cost converts the relative measurement to a numerical value.

12. The method of claim 11, wherein the relative measurement is urgency.

13. The method of claim 7, further comprising
    receiving a selection from the user of eligible points of interest, and
    wherein each point of interest in the set of identified second set of points of interest matches the user selection of eligible points of interest.

14. The method of claim 13, wherein the selection designates eligible categories of points of interest.

15. The system of claim 4, wherein the inferred navigation route is based in part on a prediction score determined by tracked user behavior.

16. The system of claim 4, wherein the costs are measured in estimated driving time.

17. The system of claim 4, wherein the third threshold cost is based on a user-selectable measurement of urgency.

18. The system of claim 4, wherein the user interface module is further adapted to receive a user selection of eligible points of interest, and the routing engine is further adapted to exclude points of interest from the fourth set of points of interest that do not match the user selection of eligible points of interest.

* * * * *